United States Patent [19]

Visser et al.

[11] Patent Number: 5,743,740
[45] Date of Patent: Apr. 28, 1998

[54] EDUCATIONAL WORD AND LETTER GAME AND METHOD OF PLAYING

[76] Inventors: Richard Visser; Janice Visser, both of 16001 Cotillion Apt. 707, Houston, Tex. 77060

[21] Appl. No.: 575,607

[22] Filed: Dec. 20, 1995

[51] Int. Cl.⁶ .................................................. G09B 19/22
[52] U.S. Cl. .................... 434/128; 434/156; 434/157; 434/159; 434/167; 434/188; 434/191; 434/209; 434/428; 273/269
[58] Field of Search ............................ 434/128, 156, 434/157, 159, 167, 188, 191, 209, 81, 428; 273/269

[56] References Cited

U.S. PATENT DOCUMENTS

| | | | |
|---|---|---|---|
| 461,346 | 10/1891 | Krebs | 273/269 |
| 760,384 | 5/1904 | Dieterich | |
| 3,413,004 | 11/1968 | Smith | 273/135 |
| 3,464,124 | 9/1969 | Lynd | |
| 3,545,101 | 12/1970 | Pike | 434/209 X |
| 3,602,513 | 8/1971 | Breen | 273/135 B |
| 3,665,618 | 5/1972 | Hahn | 434/167 X |
| 4,021,937 | 5/1977 | Kravitz | 434/167 |
| 4,973,058 | 11/1990 | Breen | 273/240 |

FOREIGN PATENT DOCUMENTS

| | | | |
|---|---|---|---|
| 491948 | 8/1950 | Canada | |
| 872703 | 7/1961 | United Kingdom | 273/269 |

*Primary Examiner*—Jeffrey A. Smith
*Attorney, Agent, or Firm*—Roberts & Brownell

[57] ABSTRACT

A multi-level educational game apparatus and method for teaching children and adults language, mathematical, and other skills. The educational game includes a board and a plurality of cards. The board comprises a plurality of rows and columns, each having a letter, word, or picture imprinted thereon. The cards have letters, words, numbers, symbols, or pictures imprinted thereon that correspond to the participant's boards. The board game includes multi-levels of difficulty corresponding to varying individual language and other ability levels. An instructor will read aloud the card and give a brief explanation of the card's contents. When a participant recognizes the cards contents on his board, he will cover the respective box with a marker. The object of the game is to complete a row or other predetermined sequence of boxes prior to another participant. The game is designed to alleviate the frustrations of individuals who are having difficulty with the board level as well as entertaining those individuals who have lost interest with learning language and other skills. Additionally, the game is designed to assist learning impaired individuals with language skills.

14 Claims, 5 Drawing Sheets

| WET | | MAN | | SAT |
|---|---|---|---|---|
| REED | TACK | | HOT | |
| | UP | F R E<br>S P A E<br>C E | | JUMP |
| MAKE | | DIG | RACK | |
| | | HAND | | HUG |

FIG. 2

LETTER CARD

B

PICTURE CARD

WORD CARD

ADVANCED WORD CARD

EDUCATIONAL WORD AND LETTER GAME AND METHOD OF PLAYING

FIELD OF THE INVENTION

The present invention relates generally to a multi-level educational board game designed to teach children and adults vocabulary and pronunciation skills utilizing phonetics, words, and pictures while maintaining the attention and interest of the game participants. The present invention further relates generally to teaching children and adults vocabulary building techniques and other skills, by utilizing phonetics, words, word phrases, numbers, symbols, and pictures in an entertaining game format.

BACKGROUND OF THE INVENTION

Learning pronunciation and building vocabulary plays an integral role in an individual's ability to effectively communicate in our society. Learning other skills such as mathematics, chemistry, geology, and other disciplines also plays an integral role in an individual's effort to effectively function in a profession. Over the last few decades the art of communicating and the mastery of other skills have become even more important in light of the need for dealings in business, education, and society. This is especially important for those who have difficulty mastering and understanding the English language. Effective communication in a foreign language or learning other necessary skills, such as mathematics is equally critical.

In light of the importance of communicating effectively, and teaching students other subjects, instructors are faced with the daunting task of teaching children as well as adults effective communication skills, which begin with proper word pronunciation and building one's vocabulary, as well as other disciplines. Such teaching is especially critical to non-natural English speakers. Methods of teaching these skills have been quite stagnant over the past several decades and have included rote memorization and recitation. Further, current methods of teaching typically discourage those individuals with learning deficiencies, such as attention span disorders, because there are no incentives, or fun, when learning the necessary reading, writing, mathematical, and other necessary skills.

Several inventors have attempted to devise methods for teaching the above-referenced skills in a more fun-filled environment; however, no single or combination of inventions teach these skills so as to educate, entertain, and insure the participant's full participation. For example, U.S. Pat. No. 491,948 to Darden et al. discloses a board game that is played by several players which comprises a board having rectangular rows and columns wherein the upper most row consists of different color rectangles with the remainder of rectangles consisting of imprinted words. An instructor draws a card which consists of a color and a word. If the player finds the appropriate color and word combination on his board he will cover it with a marker. The object of the game is to cover an entire row of rectangles on the board.

U.S. Pat. No. 3,413,004 to Smith discloses a game board having a plurality of rectangles arranged in columns wherein each column has a number of imprinted letters that spell words or form sentences. At the top of each column is a colored rectangle which corresponds to the color of the letters imprinted within said columns. In completing a column the participant will wait for the instructor to announce the letters which correspond to his board. The object of the game is to complete a full column prior to any other participant.

U.S. Pat. No. 3,464,124 to Lynd discloses a phonogram teaching device which utilizes a game board divided into rectangular rows and columns wherein each rectangle has a word indicia which forms word members of phonogram classes. As the instructor chooses and reads each phonetic, the student places a marker on the corresponding word on his board. In an alternate embodiment the use of markers with phonograms, shapes, or colors placed thereon are utilized.

U.S. Pat. No. 4,021,937 to Kravitz teaches a game for individuals who have already developed reading and pronunciation skills. This invention is a game board divided into frames wherein each frame consists of an imprinted language element such as a word, word phrase, or sentence component. The instructor announces a language element and the participant places a marker on the corresponding frame on his game board. The first player to score a predetermined amount of points wins the game. The player increases his score by combining several language elements to form longer and more complex sentences. This invention seeks to improve a participant's sight reading, sentence composition, and parsing skills in English or foreign languages.

U.S. Pat. Nos. 3,602,513 and 4,973,053 to Breen teach a foreign vocabulary drill game used to teach foreign equivalents of English words. The drill game comprises a board that is divided into two vertical columns wherein one column has a number of words in one language and the opposite column has the respective English translations. The contestants choose a word card at which time they match the word (on the word card) to the corresponding translation on their boards. The game progresses until a contestant completes a full row on his board. This game is played between two or more contestants and does not involve the use of an instructor. U.S. Pat. No. 4,973,053 to Breen further discloses an improved numbering system.

Lastly, U.S. Pat. No. 760,384 to Dieterich discloses a game board consisting of spaces, each containing separate characters. Associated with each space is a separate game piece adapted to fit in the appropriate space on the game board. Imprinted on each game piece is a character which corresponds to a character on the game board spaces with the reverse side bearing a portion of a design or illustration. The subject of the game is to match the characters on the game pieces to the characters on board spaces until a completed design or illustration is shown. Upon completion of the game a numerical score will be calculated corresponding to the difficulty of the board.

All of the above references use a game board to teach language skills but in a fashion not intended to simultaneously improve the participant's word pronunciation, sentence structure, vocabulary, and visual recognition skills. While such skills are individually important, it is only through the simultaneous teaching of such skills that effective communication can occur. Further the above references do not teach mathematical or science skills, or other disciplines which are equally important to professional achievement. Additionally, current teaching methods do not entertain and encourage the student's continued participation, or alleviate the frustrations that the participant might encounter while learning the necessary reading or writing skills that are so vital to building communication skills. A further shortcoming of the current teaching methods are their inability to cater to the varying ability levels of participants, to wit the learning impaired as well as the participant who is capable of reading and advanced learning. Thus, present devices and methods of teaching the above lessons—i.e., phonetics and pronunciation, sentence structure, and vocabulary building—are not as effective as they might be in that they do not provide the necessary means for teaching varying individual ability levels in an entertaining manner and one which keeps the level of interest in any given lesson high.

A vehicle for teaching the needed vocabulary and pronunciation skills, arts, mathematics, geology, sciences and the like would comprise a game board having a series of rows and columns wherein intermittently and randomly placed within the rows and columns are letters, words, numbers and other symbols, and pictures. The game would further comprise a series of multiple skill levels so that individuals can gradually increase their command of the language or other disciplines. This system should use a variety of entertaining techniques so that all participants can learn the nuances of a language, or other knowledge building blocks in an entertaining and purposeful manner without losing interest.

SUMMARY OF THE INVENTION

It is therefore an object of the present invention to teach children and adults language and other skills utilizing a game board that will employ the same game format for participants as their ability levels grow.

It is a object of the present invention to employ visual images as a means for encouraging continual participation in the educational game.

It is a further object of the present invention to teach children and adults visual recognition skills by utilizing pictures or symbols on a game board.

It is still a further object of the present invention to provide an educational game utilizing pictures, letters, and words on a game board that will entertain and keep the attention of the participants while they are learning language skills.

It is yet a further object of the present invention to provide an educational game utilizing pictures, letters, and words on a game board that will alleviate the frustrations of participants who have difficulty learning language skills.

It is still yet a further object of the present invention to provide an educational game utilizing pictures, letters, and words that will teach and keep the attention of participants who have learning disabilities.

It is another object of the present invention to teach children and adults word pronunciation skills.

It is still another object of the present invention to teach children and adults vocabulary building skills.

It is yet still another object of the present invention to provide an educational game utilizing pictures and other symbols associated with art, mathematics, science, or other lessons to teach children and adults the associated skills and knowledge that relates to such disciplines.

These and other objects and advantages of the present invention will be apparent to those of ordinary skill in the art upon inspection of the detailed description, drawings, and appended claims.

The "Educational Word and Letter Game and Method of Playing," ("the present invention") is contemplated for use by children and adults for learning language and other skills. A representative sample of these skills include pronunciation and reading skills, vocabulary building and picture recognition, as well as mathematics, geology, and other arts and sciences. The present invention can also be utilized for a wide variety of purposes which include 1) teaching the learning impaired, 2) teaching the advanced reader, and 3) entertainment reasons. As such, the present invention is used in a variety of different circumstances and for various teaching levels. The present invention will also allow the participant to use the game with an instructor or within a group.

The present invention is a multi-level board game designed to teach children and adults reading and pronunciation skills, mathematics, and other arts and science lessons, utilizing phonetics, words, numbers and other symbols, and pictures. The multi-skill level nature of the present invention affords several skill levels of increasing difficulty and is designed in a "bingo board" format—i.e., multiple columns and rows each having letters, words, or pictures imprinted thereon. How to Use:

In general, an instructor will choose a card from a deck which will depict a letter, word, number or other symbol, or picture. The instructor will then read the card to the game participants by pronouncing the letter phoneme, the word, the number or other symbol, or describing the picture. The game participant in turn will cover the appropriate box on their game boards if the recognized letter, word, or picture is present. As the difficulty of the words, numbers or other symbols, or pictures increases, the skill-level of the game board will also increase—the instructor will read more difficult words, multi-syllable words, numbers or other more complex symbols, or pictures in higher skill levels. A participant will be declared the winner of the game when he/she covers an entire row in the horizontal, vertical, diagonal, or other predetermined sequence.

The pictures imprinted on the present invention's boards are intended to alleviate any frustration that the game participants may encounter when they are having difficulty with any specific level board level by allowing at least some boxes to be covered. This feature ensures that every participant will be able to cover at least a certain portion of the game board regardless of the letters, words, numbers or other symbols, that are read. The pictures will also entertain the game participants as well as focus the attention of those participants who have learning disorders.

BRIEF DESCRIPTION OF THE DRAWINGS

FIG. 2 shows a plan view of a second level game card.

DETAILED DESCRIPTION OF THE INVENTION

Figure 1:
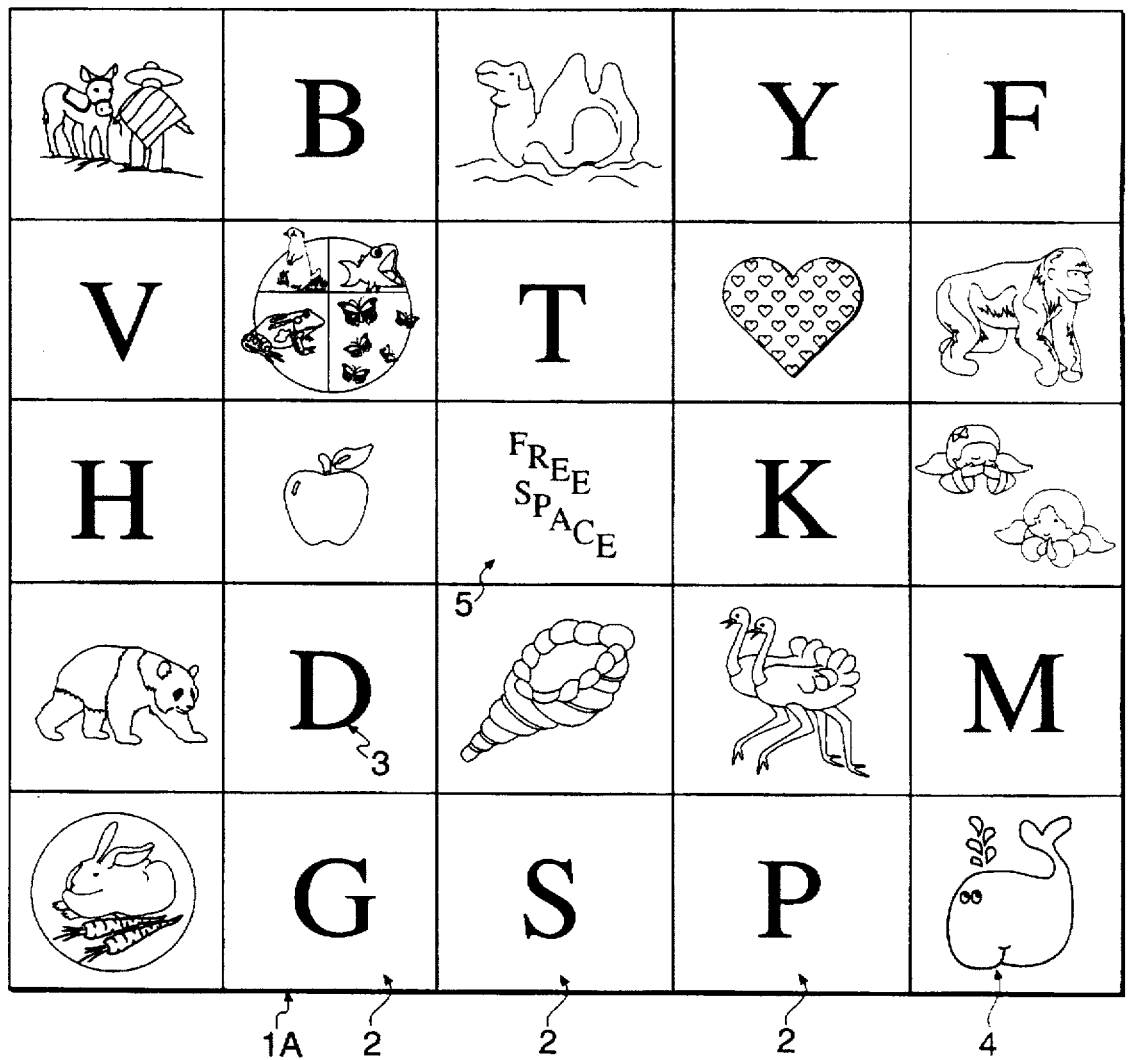
FIG. 1 shows a plan view of a first level game card.

The present invention is a game board designed to teach children as well as adults language skills and techniques so that they may communicate effectively. The dimensions of the game board, including boxes, rows, columns, letters, pictures, and other variables and quantities specified herein may vary with the type of game board contemplated for use with the present invention. Therefore, numbers and dimensions specified herein are not to be construed as limitations on the scope of the present invention but are meant to be merely illustrative of one particular application. For example, it is contemplated that the rows and columns of the board may be assembled in different arrangements so as to accommodate any number of combinations of letters, words, numbers or other symbols, pictures, shapes, and word phrases.

Further, the detailed description of the present invention is also based on a method of teaching children and adults language and other skills utilizing the present invention boards as specified herein. Therefore, methods specified herein are not to be construed as limitations on the scope of the present invention but are meant to be merely illustrative of one particular application. For example, it is contemplated that an instructor will read various combinations of letters, words, numbers or other symbols, or pictures to the game participants to accommodate different ability levels.

The present invention is a board game designed to teach children and adults reading and pronunciation skills, as well as vocabulary building and sentence structure techniques utilizing letters, words, and pictures. Alternate embodiments will teach mathematic and other science skills (i.e. geology, physics, chemistry, environmental, etc.) and the arts (artists, artist style, such as impressionist and realist, etc.) The present invention affords several skill levels of increasing difficulty and challenge in the nature of various board levels. Thus, the present invention can be used by participants of varying ability levels—e.g., learning disabled persons to advanced readers. The skill levels of the present invention preferably include the following:

(i) Beginner-level board: single letters and simple pictures combined on the game board;

(ii) Intermediate-level board: mono-syllable words and more advanced pictures combined on the game board;

(iii) Advanced-level board: multi-syllable and mono-syllable words and advanced pictures combined on the game board; and (iv) Successive level boards: more advanced words, word phrases, and pictures combined on the game board for the advanced game participants.

Alternate embodiments of the present invention will use numbers and other symbols, such as chemistry and physic symbols and terminologies, environmental and geological terms, or business terms, etc. in the various skill levels. The higher the skill level the more difficult the alternate terms will become.

Thus, the present invention will include several boards of varying skill levels. Of course, one skilled in the art of the present invention will realize that a combination of the above skill levels can be combined to form numerous variations of the present invention.

The game boards of the present invention are designed in rows and columns which form a grid pattern thereon. In the preferred embodiment there will be five rows and five columns imprinted on each game board (on each level), thereby forming twenty-five boxes. Placed within the boxes will be letters, words, word phrases, or pictures of varying combinations and sequences. As stated previously alternate embodiments of the present invention will include other symbols and terminologies. The instructor or another individual (when the game is used without an instructor) will choose at least one picture from a deck of cards that corresponds to the participants game boards during the course of the game—regardless of the difficulty level. Hereinafter reference to an instructor will include any game participant or any other persons participating in any manner in the present invention.

The object of the present invention is to complete a diagonal, horizontal, or vertical row before another participant does the same. In alternative embodiments the object of the game may be to complete a predetermined sequence of boxes, such as all the corners of the game board, prior to another participant doing the same. To complete a row or a predetermined sequence of boxes the instructor will draw a card which will include a letter, word, or picture (or in the case of an alternate embodiment, a number or other symbol). Thereafter, the participant will find the corresponding letter, word, or picture on his game board and cover the same with a marker. A participant will win the game when he covers a full row of boxes or any predetermined sequence of boxes prior to another participant completing his game board.

Figure 3:
FIG. 3 shows a plan view of a third level game card.

Referring to FIGS. 1, 2 and 3, a "free space" 5 is placed in the middle box of the game boards 1a, 1b, and 1c, respectively, to assist the participant in completing a row or predetermined sequence of boxes. In alternate embodiments the "free Space" 5 can be located on any box 2 on the game boards 1a, 1b, and 1c or, be excluded from the game boards entirely. The "free square" 5 can be covered by the participant at anytime during the course of the game.

Figures 4, 5:
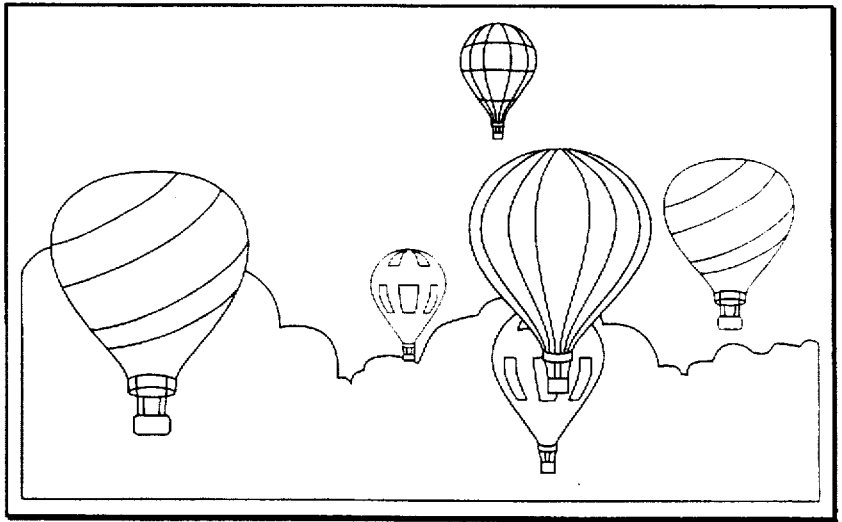
FIG. 4 shows a plan view of a game card which depicts a letter "B" thereon.
FIG. 5 shows a plan view of a game card which depicts a picture thereon.

Referring to FIG. 1 a beginner-level game board is shown. It is desirable that the beginner-level game board be the simplest game level and be entitled "Alphabet Game", since only letters 3, pictures 4, and "free space" 5 are depicted in the boxes 2 of the game board 1a. At this level any letter or simple picture will be shown in the boxes 2 of the game board 1a. To play this level the instructor will read a card 8 or 9 aloud as shown in FIGS. 4 and 5. The card 8 or 9 will have a letter or picture, respectively, placed thereon corresponding to the letters 3 or pictures 4 on the game board 1a. In alternate embodiments, or other levels, the cards 8 or 9 will have mono and multi-syllable words, word phrases, or more advanced pictures.

In the preferred method, the instructor will choose the card 8—with a letter imprinted thereon—and will say that letter aloud and make the appropriate letter phoneme sound or sounds. By way of example, if the instructor chooses the letter "B" he will say "bee"—or the phoneme for the letter. If a game participant has the corresponding letter on his game card, he will cover it with a "bean" or other marker. The use of a "bean" is preferred because it will keep the present invention fun and entertaining for the participants.

Alternatively, the instructor may choose card 9 which has a picture depicted thereon as referenced in FIG. 5. In this instance the instructor will read the card aloud and the game participant will cover the corresponding picture with a "bean" or other marker on the game board 1a if such picture is present. When reading the picture card 9 it is desirable to have the instructor provide a brief explanation of the picture as well. For example if a picture of a "whale" is read aloud, the instructor might accompany the reading of the "whale" with "the largest mammal in the world and it lives in the water" as an explanation. An explanation of the picture is not critical to the preferred embodiment; however, it is intended to teach the participant various interesting facts concerning the picture as well as assist the participant in constructing sentences and building his vocabulary. In essence it is a helpful teaching technique.

As referenced in FIG. 2 an intermediate-level game board is shown. It is desirable that the intermediate-level game board 1b be more difficult than the beginner-level game board 1a as referenced in FIG. 1. In the preferred embodiment the intermediate-level game board 1b will be entitled "Word Family Game" and will include imprinted pictures 4, simple words 6—preferably mono-syllable words—and the "free space" 5 imprinted on the middle box of the game board 1b. As noted previously, the "free space" 5 can be located in any box on the game board 1b, or excluded entirely.

Figure 6:
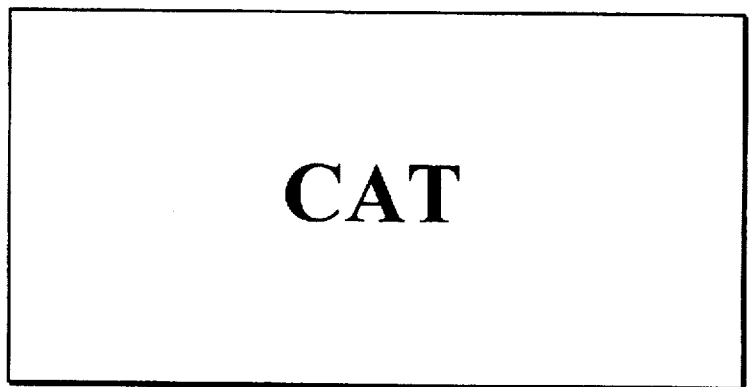
FIG. 6 shows a plan view of a game card which depicts a simple word thereon.

In order to play the intermediate-level game board 1b the instructor will read the card 9 or 10 aloud as shown in FIGS. 5 and 6, respectively. The cards 9 or 10 will have a picture or simple word, respectively, imprinted thereon corresponding to the pictures 4 or words 6 on the game board 1b. It is envisioned that alternate embodiments, or other levels, will have mono and multi-syllable words, word phrases, or more advanced pictures imprinted on the cards 9 and 10.

In the preferred method the instructor will read and spell the word as depicted on the word card 10, and thereafter use the word in a sentence. At this juncture the instructor may also define the word for the participants. For example, if the instructor chooses the word "cat" he will say "c-a-t" and "the cat is fast and nimble". At this time the instructor may also define the "cat" as "a nocturnal mammal that belongs to the Feline family". If a game participant has the corresponding word on his game board, he will cover it with a "bean" or other marker. Spelling, defining, and using the word in a sentence will aid the participants in developing language skills—i.e., vocabulary building, sentence structure, spelling, and pronunciation skills. Note, however, that spelling, defining, and using the word in a sentence is not critical to the present invention.

Alternatively, the instructor may choose picture card 9 which has a picture depicted thereon as referenced in FIG. 5. In this instance the instructor will read the picture card 9 aloud and the game participant will cover the corresponding picture with a "bean" on his game board. As previously disclosed, it is desirable to have the instructor provide a brief explanation of the picture as well. An explanation of the picture is not critical to the preferred embodiment.

As referenced in FIG. 3 an advanced-level game board is shown. It is preferred that the advanced-level game board 1c be more difficult than the intermediate-level game board 1b as referenced in FIG. 2. In the preferred embodiment the game board 1c will be entitled "Vocabulary Game" and will include more advanced pictures and words—preferably multi-syllable words—and the "free space" 5 imprinted in the middle box of the game board 1c. Again, the "free space" 5 can be located in any box 2 on the game board 1c, or be excluded entirely. It is preferred that the words utilized in this level comprise multi-syllable words; however, single syllable words would suffice.

Figure 7:
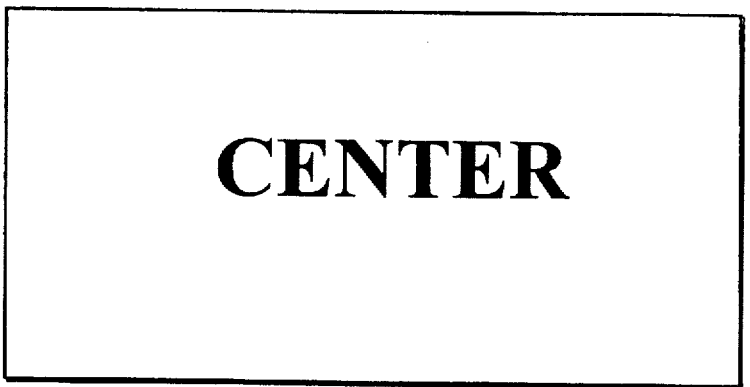
FIG. 7 shows a plan view of a game card which depicts an advanced word thereon.

In order to play the advanced-level game board 1c the instructor will read the card 9 or 11 aloud as shown in FIGS. 5 and 7, respectively. In this instance, the cards 9 and 11 will have a picture or advanced word, respectively, imprinted thereon corresponding to the words 7 or pictures 4 on the game board 1c. It is envisioned that alternate embodiments, or other levels, will have mono and multi-syllable words, word phrases, or other pictures imprinted on the cards 9 and 11.

In the preferred method the instructor will read, spell, and define the advanced word, and thereafter use it in a sentence. For example, if the instructor chooses the word "center" he will say "c-e-n-t-e-r", "a center is defined as a middle of an object", and "I am standing in the center of the classroom", respectively. If a game participant has the corresponding word on his game card, he will cover it with a "bean" or other marker. Spelling the word, defining the word, and using the word in a sentence will assist all participants, including learning impaired individuals, in developing language skills—i.e., vocabulary building, sentence structure, spelling, and pronunciation skills.

Alternatively, the instructor may choose card 9 which has a picture depicted thereon as referenced in FIG. 5. In this instance the instructor will read the card aloud and the game participant will cover the corresponding picture with a "bean" on the game board 1c. As previously disclosed, it is desirable to have the instructor provide a brief explanation of the picture; however, this is not critical to the preferred embodiment.

Successive levels of the present invention will include more advanced words, pictures, and word phrases imprinted on the game 4 boards. The successive levels will be more advanced than the game boards 1a, 1b, or 1c as depicted in FIGS. 1, 2, and 3. It is preferred that this level comprise multi-syllable words and word phrases.

In order to play successive levels of the present invention the instructor will read cards that have multi-syllable words, word phrases, and pictures imprinted thereon. The multi-syllable words, word phrases, and pictures imprinted thereon will correspond to the multi-syllable words, word phrases, and pictures on the participant's game boards.

In the preferred method the instructor will read the word phrase and, thereafter, use the word phrase in a sentence. As an example, if the instructor chooses the word "I am happy" he will say "I am happy teaching the students language skills". If a game participant has the corresponding word phrase on his game card, he will cover it with a "bean" or other marker. Word phrases will assist the participants with sentence structure as well as vocabulary building. When the instructor reads a card with a word or picture he will follow the above referenced methods concerning words and pictures.

In alternate embodiments, the game board will comprise numbers, scientific terms, or other terminologies associated with categories, such as art, music, sports, business, industry, religion, etc. In the alternate embodiment the instructor will perform the same methods as described above, to wit, the instructor will read cards that have either numbers, scientific terms, or other terminologies associated with categories, such as art, music, sports, business, industry, religion, etc., and pictures imprinted thereon. The numbers, scientific terms, or other terminologies associated with categories, such as art, music, sports, business, industry, religion, etc., and pictures imprinted thereon will correspond to the numbers, science terms, or other discipline terminologies, such as art, music, sports, business, industry, religion, etc., and pictures on the participant's game boards.

As way of example, on the beginner game board level, the instructor will choose the card—with a one digit number imprinted thereon—and will say that number aloud. If a game participant has the corresponding number on his game card, he will cover it with a "bean" or other marker. Alternatively, the instructor may choose a picture card and the game participant will cover the corresponding picture with a "bean" or other marker on the game board if such picture is present. Again, it is desirable to have the instructor provide a brief explanation of the picture as well. In order to play the intermediate-level game board the instructor will read the card which will have a higher digit number or picture imprinted thereon corresponding to the numbers or pictures on the game board. At this juncture the instructor may also use simple addition and subtraction, such that the totals of the added or subtracted numbers are imprinted on the game participants game board. As way of illustration, the instructor may recite 10 minus 4 and the game participant must calculate the equation, and as such place a "bean" or marker on the number 6. In an advanced-level game board the instructor will read a card with advanced numbers utilizing advanced mathematical equations. Once again the game participant must calculate the advanced equations and place a "bean" or marker on the corresponding square on his game board. Of course other variations of this theme are envisioned such as advanced numbers with simple or no equations. Again, the "free space" 5 can be located in any box on the game board, or be excluded entirely. The use of pictures in the above explained manner is also envisioned on the alternative embodiments.

Another example of the alternate embodiment may include the use of chemistry or other science terms. In the case of chemical terms, the beginner level would envision the use of the chemical names which would tie read by the instructor and thereafter the student would place a "bean" or marker on the corresponding square. In more advanced levels the instructor may recite the chemical name and the participant must find the corresponding chemical abbreviation, atomic number, mass, number of orbits, or other information concerning the recited chemical on his game board. When using scientific terms it is envisioned that scientific symbols may also be used such as the structure of an atom. Again, the use of pictures are envisioned with use of the alternate embodiments, as well as the use of the "free space" 5 if desired.

The pictures 4 in game boards 1a, 1b, and 1c as shown in FIGS. 1, 2, and 3, and other successive levels serve several functions. In particular, a brief explanation of the picture (as explained above) will build the vocabulary as well as teach sentence structure to the game participants. As stated previously, this is accomplished when the instructor gives a definition of the picture and uses that definition in a grammatically correct sentence. Additionally, the pictures 4 will capture the attention of the participants so that they will be encouraged to keep playing the game at the various skill levels—even if the level is far beyond their reading capabilities.

The pictures 4 will also play a significant role in teaching learning impaired participants. In this context, when the picture 4 is read aloud, those participants who have learning disabilities such as deficit span disorders, or as important, who have difficulty with the game level, can still participate in the game by covering the corresponding picture. This will ensure the full participation of learning impaired participants. It is preferred that at least one picture corresponding to every participant's game board be read aloud by the instructor during the course of a game, thereby encouraging the participation of all participants—since the participants will be anticipating that a picture will be read.

Those participants with learning disorders will find that the pictures are fun, entertaining, and easy to understand—especially when the instructor furnishes the participants with a brief explanation. Thus, even if the participant cannot find the letter, word, word phrase, or begins to lose interest in the game, he will be brought back to participate in the game when the pictures 4 are read aloud by the instructor and can be found on the participant's board.

The instructor is not important to any of the above disclosed embodiments, and as such, the present invention may be played by oneself or in a group without the use of an instructor. If there is no instructor than one of the game participants or any other person will read the cards as depicted in FIGS. 4, 5, 6, and 7, and in the manner as explained above.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons skilled in the art. In particular it is envisioned that the above referenced game board levels be modified to include any combination of letters, words, pictures, and word phrases within at least one game board level and be tailored to several individual ability levels.

What is claimed is:

1. An educational teaching game, comprising:
    (a) a set of game cards selected from a plurality of sets of game cards, said plurality of sets of game cards comprising varying skill levels, at least one of said game cards of said set each having a character imprinted thereon and at least one of said game cards of said set each having a picture imprinted thereon, where the character is selected from the group consisting of a letter, a number, a word phrase, and a symbol;
    (b) a set of game boards selected from a plurality of sets of game boards, said plurality of sets of game boards comprising said varying skill levels, each of said game boards of said set of game boards further comprising a multitude of rows and columns which form spaces, at least one of said spaces each having a randomly selected character imprinted thereon and at least one of said spaces each having a randomly selected picture imprinted thereon, wherein each character is selected from the group consisting of a letter, a word phrase, a number, and a symbol, and each character and each picture on each game board of said set of game boards corresponds to a character and a picture imprinted on said set of game cards, respectively;
    (c) a plurality of markers for placing on said spaces in response to said set of game cards; and
    (d) a free space located in one of the spaces formed by the multitude of rows and columns.

2. An educational teaching game of claim 1, wherein each of said skill levels are more difficult than a previous skill level.

3. An educational teaching game of claim 1, wherein at least one character on each of said game boards of said set of game boards each further comprises one letter randomly placed within one of a plurality of said spaces wherein each such space has a different letter placed therein, and further comprises one picture randomly placed in at least one space where a letter is not placed therein, and wherein at least one of said game cards of said set of game cards each comprises one letter thereon, wherein each said letter and each said picture on said set of game boards corresponds to a letter and a picture on said set of game cards, respectively.

4. An educational teaching game of claim 1 wherein a plurality of said game cards of said set of game cards have a character imprinted thereon, wherein at least one of said plurality of game cards of said set of game cards each comprises a symbol and at least one of said plurality of game cards of said set of game cards each comprises a word phrase; and wherein a plurality of said spaces of each of said game boards of said set of game boards each have one of a randomly selected character thereon, wherein at lease one of said spaces each has a symbol thereon and at least one of said spaces each has a word phrase thereon, wherein each said symbol, each said word phrase, and each said picture on each of said game boards of said set of game boards corresponds to a symbol, a word phrase, and a picture, respectively, on one of said plurality of game cards of said set of game cards.

5. A method of teaching, comprising:
    (a) providing a game, said game comprising:
        a set of game cards selected from a plurality of sets of game cards, said plurality of sets of game cards comprising varying skill levels, at least one of said game cards of said set each having a character imprinted thereon and at least one of said game cards of said set each having a picture imprinted thereon, where the character is selected from the group consisting of a letter, a number, a word phrase, and a symbol;

a set of game boards selected from a plurality of sets of game boards, said plurality of sets of game boards comprising said varying skill levels, each of said game boards of said set of game boards further comprising a multitude of rows and columns which form spaces, at least one of said spaces each having a randomly selected character imprinted thereon and at least one of said spaces each having a randomly selected picture imprinted thereon, wherein each character is selected from the group consisting of a letter, a word phrase, a number, and a symbol, and each character and each picture on each game board of said set of game boards corresponds to a character and a picture imprinted on said set of game cards, respectively;

a plurality of markers for placing on said spaces in response to said set of game cards; and a free space located in one of the spaces formed by the multitude of rows and columns;

(b) an instructor selecting at least one game card from said set of game cards;

(c) the instructor reciting information that corresponds to each selected game card (d) a game participant locating a character or a picture imprinted on a space on a game board of said set of same boards that corresponds to said recited information; and (e) a game participant placing a marker on said space on said game board that has said character or said picture that corresponds to said recited information.

6. A method of teaching as recited in claim 5, wherein said marker is placed on said free space at anytime during the course of the game.

7. A method of teaching as recited in claim 5, wherein said marker is placed on said spaces until a row, column, or other predetermined sequence is filled.

8. A method of teaching as recited in claim 5, wherein the step of reciting information further includes reciting a word in a sentence.

9. A method of teaching as recited in claim 5, wherein the step of reciting information further includes reciting a definition of a word.

10. A method of teaching as recited in claim 5, wherein the step of reciting information further includes reciting a number's addends, subtrahends, divisors, or quotients.

11. A method of teaching as recited in claim 5, wherein the step of reciting information further includes reciting a phonetic corresponding to a letter.

12. A method of teaching as recited in claim 5, wherein the step of reciting information further includes reciting an explanation of a picture.

13. A method of teaching as recited in claim 5, wherein the step of reciting information further includes the spelling of a word.

14. A method of teaching as recited in claim 5, wherein the step of reciting information further includes reciting a sentence using a word phrase.

* * * * *